United States Patent
Tsukada et al.

(10) Patent No.: US 8,342,286 B2
(45) Date of Patent: Jan. 1, 2013

(54) NORMALLY-OPEN TYPE CLUTCH STRUCTURE

(75) Inventors: Yoshiaki Tsukada, Saitama (JP); Takashi Ozeki, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 78 days.

(21) Appl. No.: 12/891,298

(22) Filed: Sep. 27, 2010

(65) Prior Publication Data
US 2011/0073433 A1   Mar. 31, 2011

(30) Foreign Application Priority Data
Sep. 30, 2009   (JP) ................... 2009-227849

(51) Int. Cl.
*B60K 17/02* (2006.01)
*B60K 23/02* (2006.01)
*F16D 25/00* (2006.01)

(52) U.S. Cl. .......... 180/336; 180/292; 192/85.49
(58) Field of Classification Search ........... 180/292, 180/336; 192/85.42, 85.49, 85.5, 85.39
See application file for complete search history.

(56) References Cited

U.S. PATENT DOCUMENTS

| | | | | |
|---|---|---|---|---|
| 4,049,101 A * | 9/1977 | Hattori et al. | ........... | 192/48.601 |
| 4,509,627 A * | 4/1985 | Kawamoto | ........... | 192/85.02 |
| 5,836,158 A * | 11/1998 | Nakajima | ........... | 60/436 |
| 5,911,295 A * | 6/1999 | Itonaga et al. | ........... | 192/70.28 |
| 6,085,607 A * | 7/2000 | Narita et al. | ........... | 74/335 |
| 6,146,311 A * | 11/2000 | Moorman | ........... | 477/150 |
| 6,174,260 B1 * | 1/2001 | Tsukada et al. | ........... | 476/50 |
| 6,440,035 B2 * | 8/2002 | Tsukada et al. | ........... | 476/50 |
| 6,892,869 B2 * | 5/2005 | Ookita et al. | ........... | 192/85.34 |
| 7,178,650 B2 * | 2/2007 | Tsukada | ........... | 192/70.27 |
| 2008/0078639 A1 * | 4/2008 | Ogasawara et al. | ........... | 192/3.57 |
| 2008/0182720 A1 * | 7/2008 | Kobayashi et al. | ........... | 477/175 |
| 2010/0057318 A1 * | 3/2010 | Nedachi et al. | ........... | 701/68 |

FOREIGN PATENT DOCUMENTS

JP   2003-329064 A   11/2003

* cited by examiner

*Primary Examiner* — Paul N Dickson
*Assistant Examiner* — Laura Freedman
(74) *Attorney, Agent, or Firm* — Birch, Stewart, Kolasch & Birch, LLP

(57) ABSTRACT

In a normally-open type clutch structure operatively connected to a vehicle which includes an engine, a drive wheel driven by the engine, and an automatic transmission arranged between the engine and the drive wheel. A clutch operating mechanism is provided having an actuator for engaging or disengaging a clutch connected to the automatic transmission. The clutch operating mechanism performs a control so as to bring the clutch into an engaged state when the actuator is operated, and clutch operating mechanism operates the clutch so as to bring the clutch into a disengaged state when the actuator is not operated.

20 Claims, 7 Drawing Sheets

NORMALLY-OPEN TYPE CLUTCH STRUCTURE

CROSS-REFERENCE TO RELATED APPLICATIONS

The present application claims priority under 35 USC 119 to Japanese Patent Application No. 2009-227849 filed on Sep. 30, 2009 the entire contents of which are hereby incorporated by reference.

BACKGROUND OF THE INVENTION

1. Field of the Invention

The present invention relates to a normally-open type clutch structure provided to a miniaturized vehicle.

2. Description of Background Art

A miniaturized vehicle is known which includes an oil pressure generating device and a clutch structure which automatically engages or disengages a clutch due to the generation of oil pressure. See, for example, JP-A-2003-329064.

This type of miniaturized vehicle includes an automatic speed-change mechanism and does not include a manipulator which manipulates the clutch (for example, a clutch lever) and the like.

However, in such a vehicle, the oil pressure generating device does not supply a clutch working oil when the vehicle is stopped and the engine is stopped. Thus, the supply of working oil due to an operation of a piston is not performed so that the clutch is always brought into an engaged state.

More specifically, in the conventional automatic speed-change mechanism, unless any separate manipulator which disengages a clutch is provided, the clutch cannot be disengaged so that the rotation is transmitted from a drive wheel to an engine whereby it is difficult, for example, for a rider to walk while pushing a motorcycle or the like.

SUMMARY AND OBJECTS OF THE INVENTION

Accordingly, it is an object of an embodiment of the present invention to overcome the above-mentioned task that the related art possesses and to provide a normally-open type clutch structure which allows a rider to walk while pushing the vehicle when an engine is stopped at the time of stopping the vehicle without providing a clutch release mechanism such as a clutch lever.

According to an embodiment of the present invention, a normally-open type clutch structure which is provided to a miniaturized vehicle which includes an engine, a drive wheel driven by the engine with an automatic transmission arranged between the engine and the driven wheel. A clutch operating mechanism is provided having an actuator for engaging or disengaging a clutch provided to the automatic transmission by the actuator, wherein the clutch operating mechanism performs a control so as to bring the clutch into an engaged state when the actuator is operated, and clutch operating mechanism operates the clutch so as to bring the clutch into a disengaged state when the actuator is not operated.

According to an embodiment of the present invention, the clutch is operated in a disengaged state when the actuator is not operated. Thus, the clutch is brought into a disengaged state at the time of stopping the vehicle without providing the clutch release mechanism so that the transmission of rotation between the drive wheel and the engine is interrupted whereby the rider can walk while pushing the vehicle.

In this case, the clutch operating mechanism may be a hydraulic clutch operating mechanism, and the hydraulic clutch operating mechanism may perform a control so as to bring the hydraulic clutch into an electrically engaged state when working oil is supplied from the actuator, and may mechanically operate the hydraulic clutch so as to bring the hydraulic clutch into a disengaged state when the working oil is not supplied from the actuator.

Due to such a constitution, the working oil is not supplied at the time of stopping the vehicle without providing the clutch release mechanism. Thus, the hydraulic clutch is mechanically and automatically brought into a disengaged state whereby the transmission of rotation between the drive wheel and the engine is interrupted thus allowing a rider to walk while pushing the vehicle.

The hydraulic clutch operating mechanism may engage or disengage the hydraulic clutch without relying on an arbitrary manipulation of a rider.

Even when the separate manipulator such as a manipulation lever is not provided, a rider can walk while pushing the vehicle at the time of stopping the vehicle. Thus, the number of parts can be reduced thus allowing the rider to walk while pushing the vehicle with the compact structure.

The hydraulic clutch may be mechanically operated to be brought into a disengaged state by making use of a clutch spring.

The clutch can be disengaged by making use of the existing clutch spring without providing a spring separate from the existing clutch spring. Thus, the number of parts and a cost can be reduced.

The clutch spring may be arranged between a pressure plate and a clutch inner.

Since the clutch spring can be arranged by making use of the space defined between the pressure plate and the clutch inner, the hydraulic clutch operating mechanism can be formed into a compact shape.

The clutch operating mechanism may include a multi-disc clutch having a clutch outer, a clutch inner and a pressure plate, a cylindrical portion of the pressure plate may penetrate a through hole formed in the clutch inner, a holder and a lifter may be connected to a distal end of the cylindrical portion, the lifter may be fixedly mounted on the distal end of a clutch lifter rod, and the clutch spring may be arranged between the pressure plate and the clutch inner.

By allowing the cylindrical portion of the pressure plate to penetrate the through hole formed in the clutch inner and by arranging the clutch spring by making use of the space defined between the pressure plate and the clutch inner, the clutch operating mechanism can be formed into a compact shape.

The clutch spring may be arranged on an outer periphery of the cylindrical portion of the pressure plate.

The clutch spring can be arranged with the simple structure.

The miniaturized vehicle may include a frame bifurcated from a head pipe, the actuator may be mounted on the frame, and a hose which extends from the actuator may be connected to a clutch slave cylinder mounted on the engine.

The clutch actuator and the clutch slave cylinder can be fixed to the miniaturized vehicle with the simple structure.

The miniaturized vehicle may have a V-shaped engine, and the actuator may be arranged in a space defined between the cylinder and an engine body.

The actuator can be arranged by effectively making use of the space defined between the cylinders and the engine body due to a V-type engine. Thus, it is possible to efficiently arrange the actuator while suppressing the protruding of the actuator in the vehicle longitudinal direction as well as in the vehicle vertical direction.

The actuator, the hose and the clutch slave cylinder may be arranged on one side in the vehicle lateral direction.

Compared to a case where the actuator and the clutch slave cylinder are arranged on both sides in a split manner, the hose can be shortened and, at the same time, the actuator and the clutch slave cylinder are arranged only on one side in the vehicle lateral direction and hence, the maintenance property can be enhanced.

According to an embodiment of the present invention, the clutch operating mechanism performs a control so as to bring the clutch into an engaged state when the actuator is operated, and operates the clutch so as to bring the clutch into a disengaged state when the actuator is in a non-operable state. Thus, the clutch is brought into a disengaged state at the time of stopping the vehicle without providing the clutch release mechanism so that the transmission of rotation between the drive wheel and the engine is interrupted whereby the rider can walk while pushing the vehicle.

The clutch operating mechanism is the hydraulic clutch operating mechanism, and the hydraulic clutch operating mechanism performs a control so as to bring the hydraulic clutch into an electrically engaged state when working oil is supplied from the actuator, and mechanically operates the clutch so as to bring the hydraulic clutch into a disengaged state when the working oil is not supplied from the actuator. In this case, the working oil is not supplied at the time of stopping the vehicle without providing the clutch release mechanism. Thus, the hydraulic clutch is mechanically and automatically brought into a disengaged state whereby the transmission of rotation between the drive wheel and the engine is interrupted thus allowing a rider to walk while pushing the vehicle.

Further, by allowing the hydraulic clutch operating mechanism to engage or disengage the hydraulic clutch without relying on the arbitrary manipulation of the rider, even when the separate manipulator such as the manipulation lever is not provided, the rider can walk while pushing the vehicle at the time of stopping the vehicle. Thus, the number of parts can be reduced thus allowing the rider to walk while pushing with the compact structure.

By allowing the hydraulic clutch to be mechanically operated so as to bring the hydraulic clutch into a disengaged state by making use of the clutch spring, the clutch can be disengaged by making use of the existing clutch spring without providing the spring separate from the existing clutch spring and hence, the number of parts and a cost can be reduced.

Further, by arranging the clutch spring between the pressure plate and the clutch inner, the clutch spring can be arranged by making use of the space defined between the pressure plate and the clutch inner Thus, the hydraulic clutch operating mechanism can be formed into a compact shape.

By providing the multi-disc clutch having the clutch outer, the clutch inner and the pressure plate to the clutch operating mechanism, by allowing the cylindrical portion of the pressure plate to penetrate the through hole formed in the clutch inner, by connecting the holder and the lifter to the distal end of the cylindrical portion, by fixedly mounting the lifter on the distal end of the clutch lifter rod, and by arranging the clutch spring between the pressure plate and the clutch inner, it is possible to allow the cylindrical portion of the pressure plate to penetrate the through hole formed in the clutch inner and to arrange the clutch spring by making use of the space defined between the pressure plate and the clutch inner. Thus, the clutch operating mechanism can be formed into a compact shape.

By arranging the clutch spring around the outer periphery of the cylindrical portion of the pressure plate, the clutch spring can be arranged with the simple structure.

By providing the frame bifurcated from the head pipe to the miniaturized vehicle, by mounting the actuator on the frame, and by connecting the hose which extends from the actuator to the clutch slave cylinder mounted on the engine, it is possible to fix the clutch actuator and the clutch slave cylinder to the miniaturized vehicle with a simple structure.

By providing the V-shaped engine to the miniaturized vehicle, and by arranging the actuator in the space defined between the cylinder and an engine body, it is possible to arrange the actuator by effectively making use of the space defined by the cylinders and the engine body due to the V-type engine. Thus, it is possible to efficiently arrange the actuator while suppressing the protruding of the actuator in the vehicle longitudinal direction as well as in the vehicle vertical direction.

Further, by arranging the actuator, the hose and the clutch slave cylinder on one side in the vehicle lateral direction, compared to the case where the actuator and the clutch slave cylinder are arranged on both sides in a split manner, the hose can be shortened and, at the same time, the actuator and the clutch slave cylinder can be arranged only on one side in the vehicle lateral direction and hence, the maintenance property can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, one embodiment of the present invention is explained in conjunction with drawings.

Figure 1:
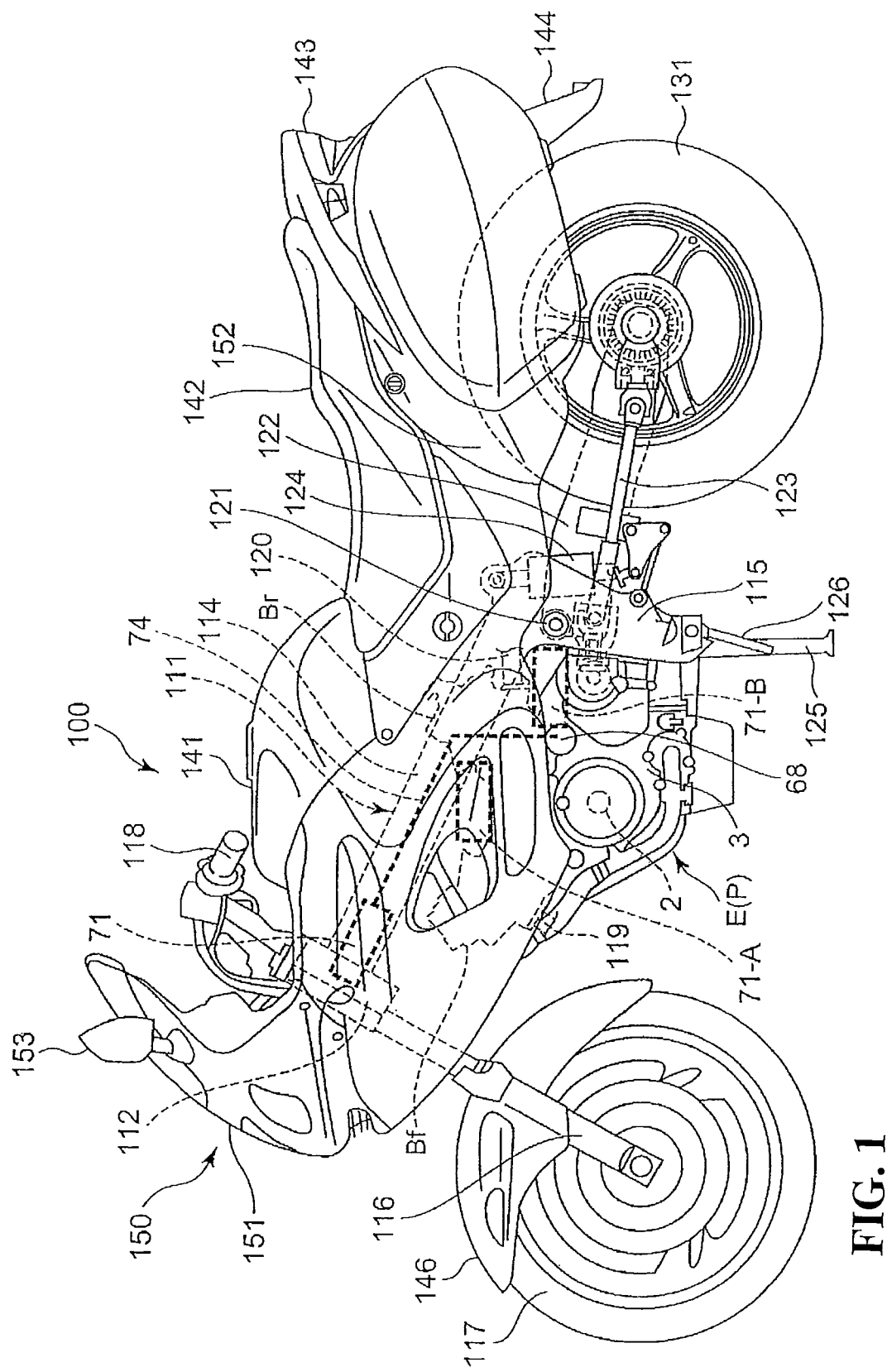
FIG. 1 is a side view of a motorcycle according to one embodiment.
Figure 2:
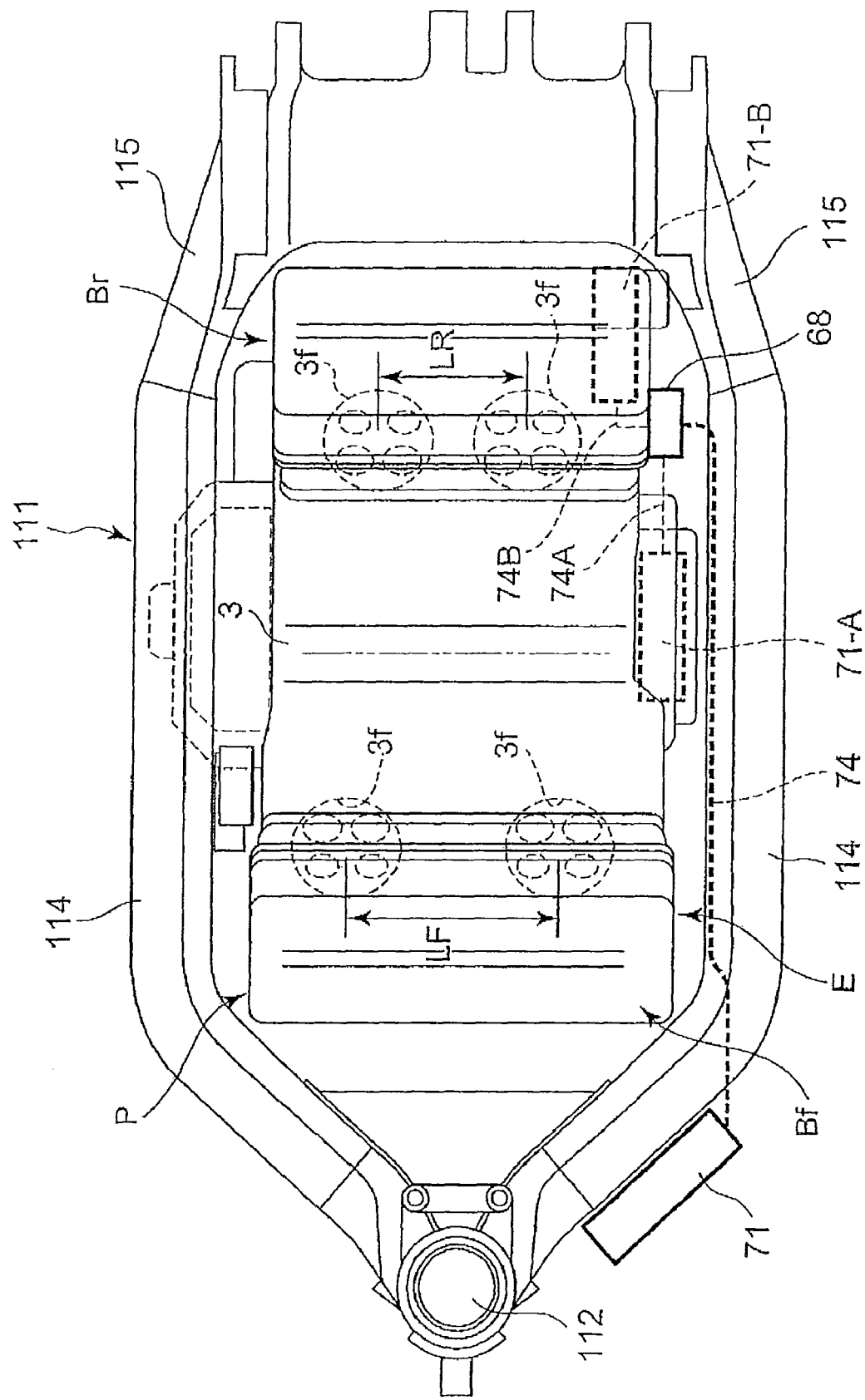
FIG. 2 is a plan view of a frame of the motorcycle.

In FIG. 1 and FIG. 2, a motorcycle 100 (a miniaturized vehicle) includes a vehicle body frame 111 of the motorcycle 100 includes a head pipe 112 which is positioned at a front portion of a vehicle body, a pair of left and right main frames 114 which extends rearward from the head pipe 112 to the vehicle body center, a pair of left and right pivot plates 115 which extends downward from the rear end portions of the main frames 114, and a rear frame (not shown in the drawing) which extends from rear end portions of the main frames 114 to a rear portion of the vehicle.

A front fork 116 is rotatably mounted on the head pipe 112, and a front wheel 117 is rotatably supported on a lower end of the front fork 116. Further, a steering handle 118 is mounted on an upper portion of the head pipe 112.

A power unit P is mounted on the main frames 114 and the pivot plates 115 in a suspended manner. Rotational power outputted from the power unit P is transmitted to a rear wheel 131 by way of a drive shaft 123 which extends in the longitudinal direction of the vehicle body.

The power unit P includes a longitudinally-V-type 4-cylinder engine E, and as shown in FIG. 2, the engine E is arranged between both main frames 114 as viewed in a plan view. The engine E is laterally arranged such that a crankshaft 2 (see FIG. 1) is directed in the laterally horizontal direction. The engine E is an OHC-type water cooling engine. The engine E is also a narrow-angle V-type engine which includes a crankcase 3 and a front bank Bf and a rear bank Br which include two cylinders respectively and are inclined frontward and rearward respectively from the crankcase 3 thus forming a V shape, wherein a bank angle of each bank is set smaller than 90 degrees.

A distance LF between cylinder bores 3f, 3f of the front bank Bf is set larger than a distance LR between cylinder bores 3f, 3f of the rear bank Br, and a width of the rear bank Br in the axial direction of the crankshaft is set smaller than a width of the front bank Bf such that the rear bank Br is concealed by the front bank Bf as viewed in a front view. As shown in FIG. 1, one end of a pair of left and right exhaust pipes 119 are connected to exhaust ports of the front bank Bf. The exhaust pipes 119 extend downward from the exhaust ports and, thereafter, are routed around the engine E toward a rear side of the vehicle body, are connected with a pair of left and right exhaust pipes 120 which extend from exhaust ports of the rear bank Br, these exhaust pipes are merged, and the merged exhaust pipe is connected to a muffler (not shown in the drawing) which is arranged behind the engine E by way of one exhaust tube (not shown in the drawing).

A pivot shaft 121 is arranged behind the power unit P, and a rear fork 122 is mounted on the pivot shaft 121 in a vertically swingable manner about the pivot shaft 121. The rear wheel 131 is rotatably supported on a rear end portion of the rear fork 122. As described above, the rear wheel 131 and the power unit P are connected to each other by the drive shaft 123 which is arranged in the inside of the rear fork 122, and rotational power from the power unit P is transmitted to the rear wheel 131 by way of the drive shaft 123.

Further, a rear shock absorber 124 which absorbs shock from the rear fork 122 extends between the rear fork 122 and the vehicle body frame 111. A stand 125 which is provided for standing the vehicle body is mounted on a rear portion of the power unit P, and a side stand 126 is mounted on a lower portion of a left side surface of the power unit P.

A fuel tank 141 is mounted on upper portions of the main frames 114 so as to cover the power unit P from above. A rider's seat 142 is positioned behind the fuel tank 141, and the seat 142 is supported on the above-mentioned rear frame. A tail lamp 143 is arranged behind the seat 142, and a rear fender 144 which covers the rear wheel 131 from above is arranged below the tail lamp 143. The motorcycle 100 includes a resin-made vehicle body cover 150 which covers the vehicle body. The vehicle body cover 150 includes a front cover 151 which continuously covers a portion of the vehicle ranging from a front side of the vehicle body frame 111 to a front portion of the power unit P and a rear cover 152 which covers a seat 142 from below. A pair of left and right mirrors 153 is mounted on an upper portion of the front cover 151. A front fender 146 which covers the front wheel 117 from above is mounted on the front fork 116.

Figure 3:
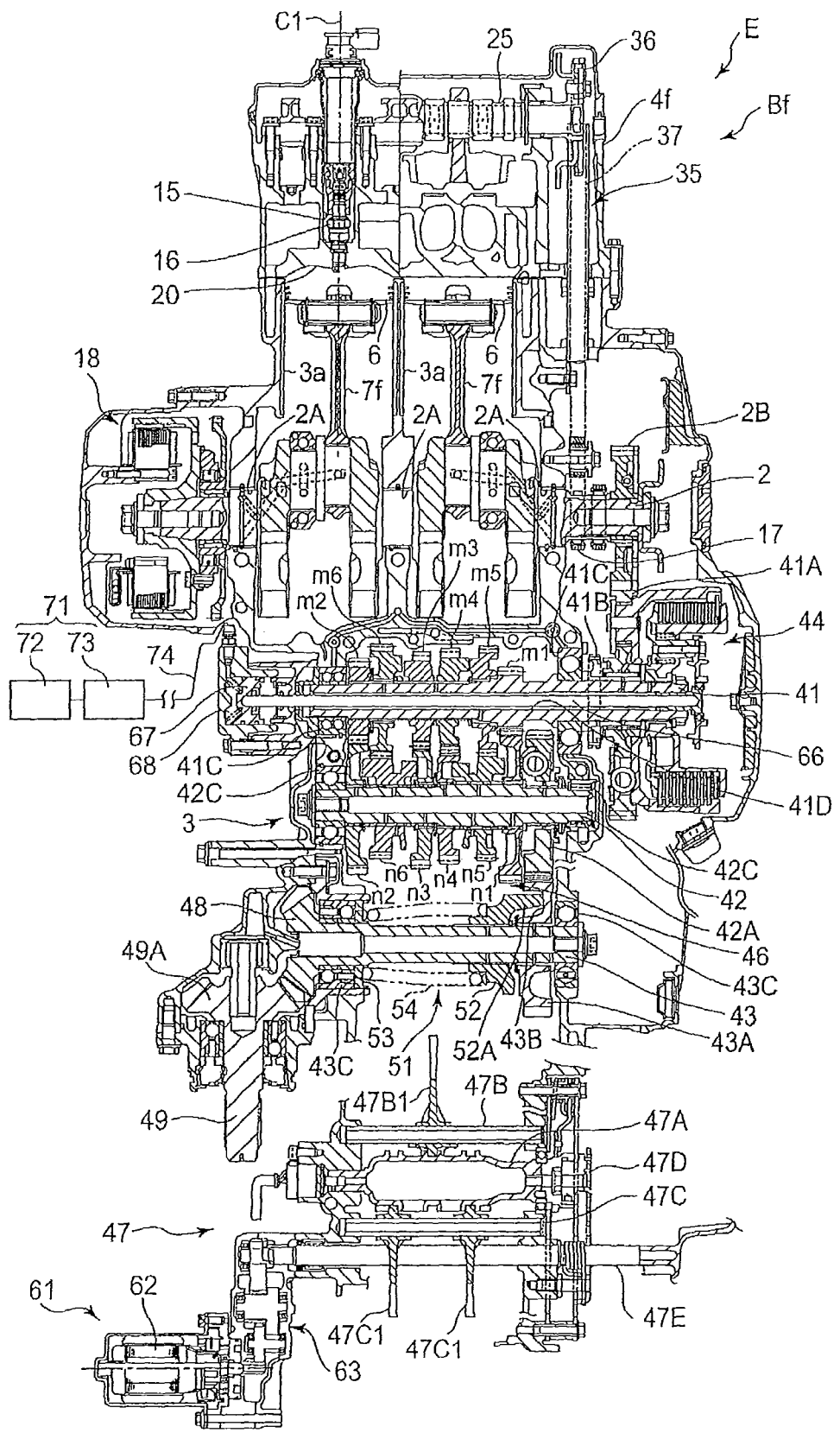
FIG. 3 is a cross-sectional view of an engine of the motorcycle.

FIG. 3 is a cross-sectional view showing an automatic speed change mechanism of the longitudinally-V-type 4-cylinder engine E. FIG. 3 shows a cross section of the front bank Bf. Since the inside of the rear bank Br is substantially equal to the inside of the front bank Bf, the explanation of the rear bank Br is omitted.

In each cylinder of a cylinder head 4f, a plug insertion hole 15 is formed on and along a cylinder axis C1 which is a center axis of the cylinder bore 3f, and an ignition plug 16 (ignition plug of the right cylinder not shown in the drawing) is arranged in the plug insertion hole 15 in a state that a distal end of the ignition plug 16 faces the inside of a fuel combustion chamber 20. A piston 6 is provided together with a connecting rod 7f.

The crankshaft 2 is rotatably supported in the inside of the crankcase 3 by metal bearings 2A which are mounted on both end portions and an intermediate portion of the crankshaft 2 in the axial direction.

A cam shaft drive sprocket wheel 17 which outputs rotation of the crankshaft 2 is mounted on a right end side of the crankshaft 2 in the drawing. A cam chain chamber 35 which extends in the vertical direction in the inside of each bank Bf, Br is formed on a cam-shaft-drive-sprocket-wheel-17 side of the engine E, and a driven sprocket wheel 36 which is integrally rotated with a cam shaft 25 is fixed to one end of the cam shaft 25 and is positioned in the inside of the cam chain chamber 35. A cam chain 37 is wound around the driven sprocket wheel 36 and the cam shaft drive sprocket wheel 17, and the cam shaft 25 is rotated by way of the cam chain 37 and the driven sprocket wheel 36 at a rotational speed which is one half of a rotational speed of the crankshaft 2. Further, on a left end side of the crankshaft 2 in the drawing, a generator 18 is mounted as a power generator.

The following explanation is provide with respect to the automatic speed change mechanism.

In the inside of the crankcase 3, a main shaft 41, a counter shaft 42 and an output shaft 43 are respectively arranged parallel to the crankshaft 2. The respective shafts 41, 42, 43 including the crankshaft 2 include a gear transmission mechanism which transmits the rotation of the crankshaft 2 to the main shaft 41, the counter shaft 42 and the output shaft 43 sequentially.

To an end of the crankshaft 2 on a cam-chain-chamber-35 side, a crank-side drive gear 2B which rotates the main shaft 41 is fixed, and the crank-side drive gear 2B is meshed with a main-shaft-side driven gear 41A of the main shaft 41. The main shaft 41 is supported by way of bearings 41C which are mounted on both ends of the main shaft 41. The main-shaft-side driven gear 41A is mounted on the main shaft 41 in a rotatable manner relative to the main shaft 41 and is connected to a clutch mechanism 44. Due to an operation of the clutch mechanism 44, the transmission of power between the crankshaft 2 and the main shaft 41 can be established or interrupted. Further, on the main-shaft-side driven gear 41A, an oil pump drive gear 41B which drives an oil pump (not shown in the drawing) is mounted.

A group of speed change gears is arranged between the main shaft 41 and the counter shaft 42 in a straddling manner, and a speed-change device 46 is constituted of these gears. Both end portions of the counter shaft 42 are supported on the bearings 42C. To explain the speed-change device 46 in detail, drive gears m1 to m6 corresponding to 6 speeds are mounted on the main shaft 41 and driven gears n1 to n6 corresponding to 6 speeds are mounted on the counter shaft 42, and the drive gear and the driven gear at the corresponding speed-change position are meshed with each other. Thus, the drive gears m1 to m6 and the driven gears n1 to n6 constitute speed-change gear pairs (combination of speed-change gears) which correspond to respective speed-change positions. The respective speed-change gear pairs respectively have speed reduction ratios which are decreased in order from the first speed to the sixth speed sequentially (become higher-speed gear pair).

The first-speed gear pair m1, n1 which has the maximum gear ratio is arranged on one end side of the main shaft 41 on which the main-shaft-side driven gear 41A is supported, and the second-speed gear pair m2, n2 is arranged on the other end side of the main shaft 41. Between the first-speed gear pair m1, n1 and the second-speed gear pair m2, n2, the fifth-speed gear pair m5, n5, the fourth-speed gear pair m4, n4, the third-speed gear pair m3, n3 and the sixth-speed gear pair m6, n6 are arranged in order from one end side of the main shaft 41.

Further, the counter shaft 42 includes an intermediate drive gear 42A which transmits the rotation of the counter shaft 42 to the output shaft 43, and a driven gear 43A of the output shaft 43 is meshed with the intermediate drive gear 42A. The output shaft 43 is supported on bearings 43C which are mounted on both ends of the counter shaft 42. Further, a cam-type torque damper 51 is mounted on the output shaft 43 in a state wherein the cam-type torque damper 51 is arranged adjacent to the driven gear 43A. The cam-type torque damper 51 is provided for alleviating a torque change when the torque change is applied to the output shaft 43, and includes a cylindrical member 52 which is mounted on the output shaft 43 in an axially movable manner by spline fitting. On a driven-gear-43A-side end surface of the cylindrical member 52, a projecting cam 52A which is meshed with a recessed cam 43B formed on the driven gear 43A is formed.

A spring receiving member 53 is fixed to the approximately center of the output shaft 43 and a coil spring 54 is arranged between the cylindrical member 52 and the spring receiving member 53 so that the cylindrical member 52 is biased toward the driven gear 43A. The cam-type torque damper 51 is constituted of the cylindrical member 52, the spring receiving member 53 and the coil spring 54. A drive bevel gear 48 is integrally mounted on a left end portion of the output shaft 43, and the drive bevel gear 48 is meshed with a driven bevel gear 49A which is integrally mounted on a front end of a drive shaft 49 which extends in the longitudinal direction of the vehicle body. Due to such a constitution, the rotation of the output shaft 43 is transmitted to the drive shaft 49.

The third-speed drive gear m3 and the fourth-speed drive gear m4 on the main shaft 41 are configured such that these drive gears are integrally mounted on the main shaft 41 by spline fitting and are selectively detachably engageable with the neighboring fifth-speed drive gear m5 or sixth-speed drive gear m6 by moving in the axial direction as shifters. The fifth-speed driven gear n5 and the sixth-speed driven gear n6 on the counter shaft 42 are configured such that these driven gears are respectively mounted on the counter shaft 42 by spline fitting and are moved in the axial direction as the shifters so as to be detachably engageable with the neighboring fourth-speed driven gear n4 and third-speed driven gear n3, respectively.

The third-speed drive gear m3 and the fourth-speed drive gear m4 on the main shaft 41 which constitute the shifters and the fifth-speed driven gear n5 and the sixth-speed driven gear n6 on the counter shaft 42 are moved by a gear shift mechanism 47 shown at a lowermost portion of FIG. 3 for performing the speed change.

The gear shift mechanism 47 includes a shift drum 47A arranged parallel to the above-mentioned shafts 41 to 43. In the front of and behind the shift drum 47A in the longitudinal direction of the vehicle body, fork shafts 47B, 47C are arranged parallel to the shift drum 47A. A shift fork 47B1 which engages with the shifter of the main shaft 41 is supported on the fork shaft 47B, and a shift fork 47C1 which engages with a shifter of the counter shaft 42 is supported on the fork shaft 47C.

The above-mentioned speed-gear pairs are changed by moving the shift forks 47B1, 47C1 of the gear shift mechanism 47, and the rotational power of the main shaft 41 is transmitted to the counter shaft 42 by way of the changed speed-gear pair.

The shift drum 47A is connected to a shift spindle 47E by way of a ratchet mechanism 47D which controls a rotational amount of the shift drum 47A.

A shift control device 61 is connected to the left end of the shift spindle 47E in the drawing, the shift control device 61 includes a shift motor 62, and the shift spindle 47E is connected to the shift motor 62 by way of a gear train 63.

At the time of performing the automatic transmission, prior to the shift operation by the gear shift mechanism 47, a hydraulic clutch (multi-disc clutch 80) is disengaged. More specifically, the hydraulic clutch is disengaged so as to bring the main shaft 41 into a free state and, thereafter, the shift operation is performed by the gear shift mechanism 47. Thereafter, the hydraulic clutch is engaged so as to transmit the rotational power of the crankshaft 2 to the main shaft 41.

The following is a description of the clutch mechanism (hydraulic clutch operating mechanism) 44.

A hollow portion 41D penetrates the main shaft 41 in the axial direction, and a clutch lifter rod 66 is arranged in the hollow portion 41D. A clutch piston 67 is fixedly mounted on the left end of the clutch lifter rod 66 in the drawing, and a clutch slave cylinder 68 is mounted on a back face portion of the piston 67. To the clutch slave cylinder 68, a clutch actuator (hydraulic clutch operating mechanism) 71 which supplies working oil to the inside of the clutch slave cylinder 68 is connected by way a hydraulic hose 74. The clutch actuator 71 includes an oil pressure generating device 72 and a hydraulic control device 73. As shown in FIG. 1 and FIG. 2, the clutch actuator 71 is arranged and fixed to the vehicle-body left side wall surface of the front end portion of the main frame 114, and the hydraulic hose 74 extends toward a rear side of the vehicle body along the main frame 114 and, as shown in FIG. 3, is connected to the above-mentioned clutch slave cylinder 68 mounted on the left end of the main shaft 41 in the drawing. It is possible to fix the clutch actuator 71 and the clutch slave cylinder 68 to the miniaturized vehicle with the simple structure.

The clutch actuator 71, the hydraulic hose 74 and the clutch slave cylinder 68 are arranged on one side (left side) in the lateral direction of the vehicle. Compared to a case where the clutch actuator 71 and the clutch slave cylinder 68 are arranged on both sides in a split manner, the hydraulic hose 74 can be shortened and, at the same time, the maintenance property is enhanced due to the arrangement of the clutch actuator 71 and the clutch slave cylinder 68 on one side. Further, as shown in FIG. 1, the clutch actuator 71 is arranged above the clutch slave cylinder 68 as viewed in a vehicle side view, and a portion of the hydraulic hose 74 is mounted along the main frame 114. Further, as shown in FIG. 2, a portion of the hydraulic hose 74 is routed around the inside of the main frame 114 from a middle portion of the main frame 114, is arranged in the inside of the main frame 114, is made to sag downward in the vertical direction toward the clutch slave cylinder 68 from an approximately middle portion of the main frame 114, and is connected to the clutch slave cylinder 68. The hydraulic hose 74 can be surely fixed to the main frame 114 and, at the same time, a length of the hose from the main frame 114 to the clutch slave cylinder 68 can be made relatively short.

More specifically, the actuator 71 is arranged above the clutch slave cylinder 68 as viewed in a vehicle side view, and the portion of the hose 74 is connected to the clutch slave cylinder 68 in such a manner that the portion of the hose 74 is mounted along the frame 114, and the portion of the hose 74 is made to sag downward in the vertical direction toward the clutch slave cylinder 68 from the frame 114. Accordingly, the hose 74 can be surely fixed to the vehicle and, at the same time, the length of the hose 74 from the frame 114 to the clutch slave cylinder 68 can be made relatively short.

The arrangement position of the clutch actuator 71 is not limited to the vehicle left side wall surface of a front end portion of the main frame 114. Provided that the engine is a longitudinally V-shaped 4-cylinder engine E, as shown in FIG. 1 and FIG. 2, a clutch actuator 71-A and a hydraulic hose 74-A may be arranged in a space which is defined between a front bank Bf and a rear bank Br. For example, a clutch actuator 71-B and a hydraulic hose 74-B may be arranged in a space which is defined below the rear bank Br. By arranging the clutch actuator 71-A or 71-B by effectively making use of the space between the cylinders which constitute the V-shaped engine E and the engine body, it is possible to efficiently arrange the clutch actuator 71 while suppressing the protruding of the clutch actuator 71 in the vehicle longitudinal direction as well as in the vehicle vertical direction. Since the position of the clutch actuator 71 approaches the clutch slave cylinder 68, the lengths of the hydraulic hoses 74-A, 74-B can be shortened. The arrangement position of the clutch slave cylinder 68 is not limited to the arrangement position on a rear bank Br side, and may be any position in the vicinity of the engine E.

Figure 4:
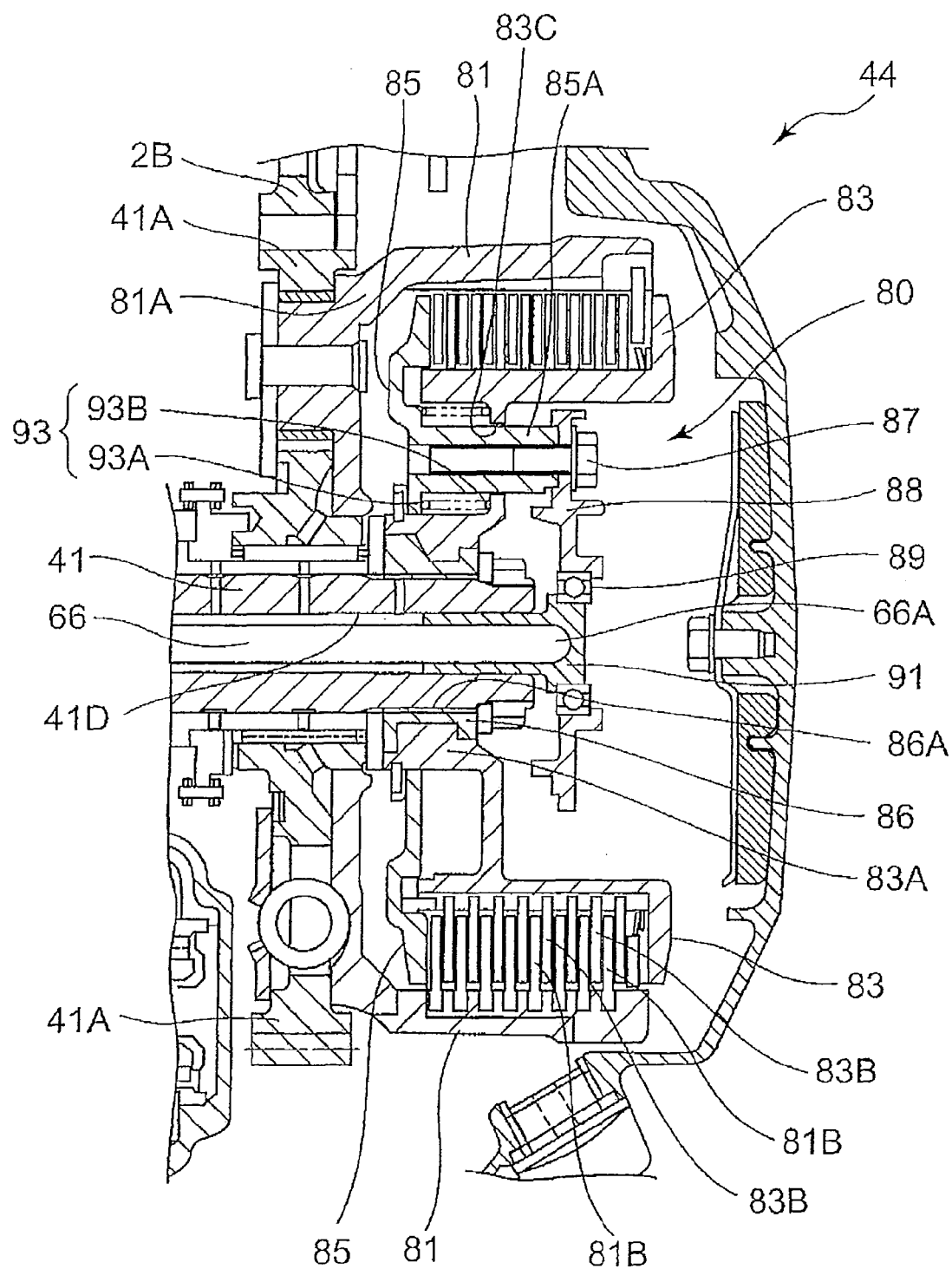
FIG. 4 is a cross-sectional view of a multi-disc clutch.

As shown in FIG. 4, a right end of the clutch lifter rod 66 in the drawing penetrates a hollow portion 41D of the main shaft 41, and the multi-disc clutch 80 is connected to a distal end 66A of the clutch lifter rod 66. The multi-disc clutch 80 includes a clutch outer 81, a clutch inner 83 and a pressure plate 85 as main components thereof. A base portion 81A of the clutch outer 81 is fixedly mounted on the main-shaft-side driven gear 41A, a boss portion 83A of the clutch inner 83 is fitted on an outer periphery of a sleeve 86, and the sleeve 86 is mounted on an outer periphery of the main shaft 41 in a non-movable manner in the axial direction and in an integrally rotatable manner with the main shaft 41 by a spline fitting 86A. The clutch outer 81 is provided with a plurality of drive friction plates 81B which are engaged with the clutch outer 81 in a non-rotatable manner relative to the clutch outer 81 and in a movable manner in the axial direction of the clutch outer 81. The clutch inner 83 is provided with a plurality of driven friction plates 83B which are engaged with the clutch inner 83 in a non-rotatable manner relative to the clutch inner 83 and in a movable manner in the axial direction of the clutch inner 83. The drive friction plates 81B and the driven friction plates 83B are alternately arranged.

The pressure plate 85 is arranged in a state wherein the pressure plate 85 is brought into contact with the drive friction plate 81B of the clutch outer 81 on a left end in the drawing. A cylindrical portion 85A is formed on the pressure plate 85, the cylindrical portion 85A penetrates a through hole 83C formed in the clutch inner 83, and a holder 88 is connected to a distal end of the cylindrical portion 85A by way of a bolt 87. A lifter 91 is connected to an inner periphery of the holder 88 by way of a bearing 89. The lifter 91 is fixedly mounted on the distal end 66A of the above-mentioned clutch lifter rod 66. Further, on an outer periphery of the cylindrical portion 85A of the pressure plate 85, a return spring (clutch spring) 93 which always returns the pressure plate 85 toward a left side in the drawing by pushing is arranged, and one end 93A of the return spring 93 is engaged with the pressure plate 85, and the other end 93B of the return spring 93 is engaged with the clutch inner 83.

The manner of operation of the clutch mechanism 44 is explained.

In FIG. 3, when the clutch actuator 71 (the oil pressure generating device 72 and the hydraulic control device 73) is operated, a fixed hydraulic force acts on the clutch slave cylinder 68, while when the clutch actuator 71 is not operated, the fixed hydraulic force does not act on the clutch slave cylinder 68. In a state where the fixed hydraulic force does not act on the clutch slave cylinder 68, as shown in FIG. 4, the return spring 93 always pushes the pressure plate 85 toward a left side so that the pressure plate 85 is separated from the drive friction plate 81B on a left end in the drawing whereby the drive friction plates 81B and the driven friction plates 83B are disengaged from each other. Due to such an operation, the clutch outer 81 and the clutch inner 83 are disengaged from each other. Thus, even when the rotational power from the main-shaft-side driven gear 41A is transmitted to the clutch outer 81, the clutch outer 81 is idled whereby the transmission of the rotational power from the main-shaft-side driven gear 41A to the main shaft 41 is interrupted.

When the clutch actuator 71 is operated and the fixed hydraulic force acts on the clutch slave cylinder 68, the clutch lifter rod 66 is moved rightward, and the pressure plate 85 is moved rightward by way of the lifter 91 and the holder 88 against a spring force of the return spring 93. Then, the pressure plate 85 pushes the drive friction plate 81B on a left end in the drawing rightward. Thereafter, the drive friction plates 81B and the driven friction plates 83B are engaged with each other. Further, the pressure plate 85 and the clutch inner 83 are connected with each other in an integrally rotatable manner by way of a friction force attributed to the return spring 93, and the rotational power from main-shaft-side driven gear 41A is transmitted to the main shaft 41 by way of the clutch outer 81, the respective friction plates 81B, 83B, the pressure plate 85 and the clutch inner 83.

The following is an explanation of the clutch actuator 71.

Figure 5:
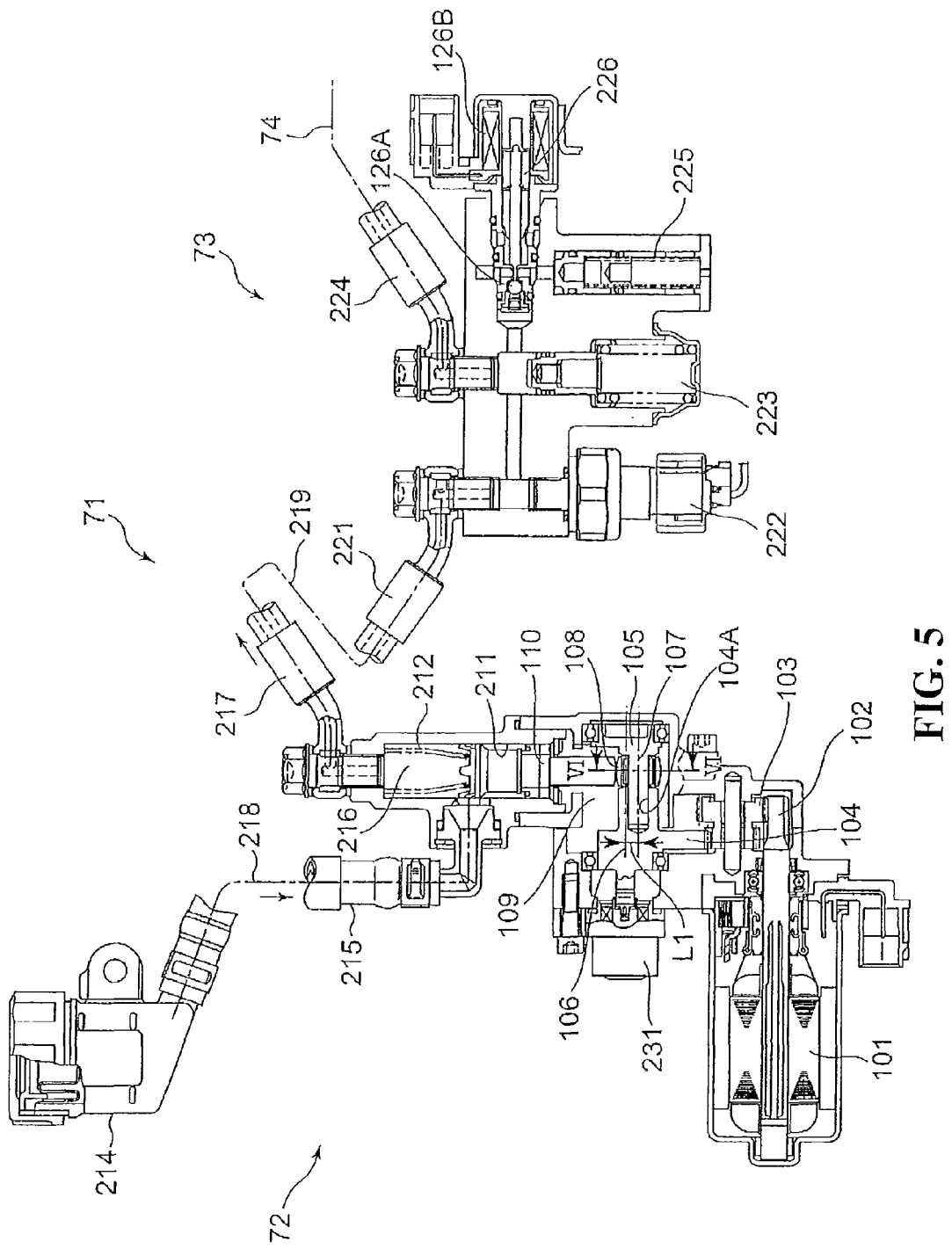
FIG. 5 is a system view of a clutch actuator.
Figure 6:
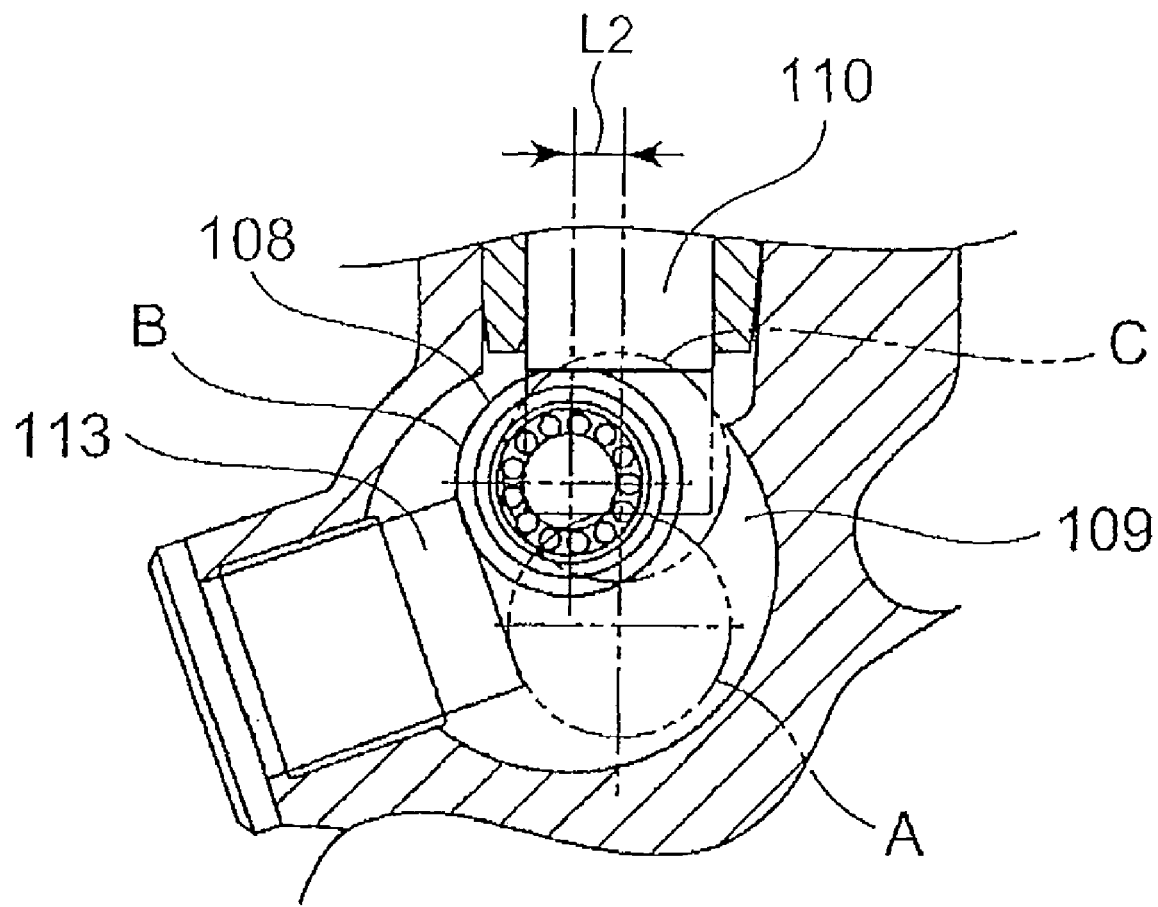
FIG. 6 is a cross-sectional view taken along a line VI-VI in FIG. 5.

FIG. 5 is a system view showing the clutch actuator 71, and FIG. 6 is a cross-sectional view taken along a line VI-VI in FIG. 5. In FIG. 5, the clutch actuator 71 includes the oil pressure generating device 72 which generates an oil pressure for manipulating the clutch and the hydraulic control device 73 which controls the oil pressure when necessary. The oil pressure generating device 72 includes a clutch control motor 101, and a drive gear 104 is connected to an output shaft 102 of the clutch control motor 101 by way of a speed reduction gear train 103. An eccentric crank receiver 104A is formed on the drive gear 104, a crank 105 is fitted in the crank receiver 104A, and the crank 105 and the drive gear 104 are formed as an integral body. The crank 105 and the drive gear 104 have an eccentric shaft 107 which is offset from a rotation axis 106 by a distance L1, and a bearing 108 is fitted on an outer periphery of the eccentric shaft 107. A piston 110 is brought into contact with an outer periphery of the bearing 108 in a crank chamber 109. The piston 110 extends in a cylinder 211 and is biased toward the bearing 108 by a spring 212.

When the clutch control motor 101 is operated, the drive gear 104 and the crank 105 are integrally rotated about the rotation axis 106 by way of the speed-reduction gear train 103. As shown in FIG. 6, a rotatable range of the crank 105 is defined between a position A and a position B. When the clutch control motor 101 is rotated in the normal direction, the crank 105 is rotated in the counterclockwise direction from the position A to the position B, while when the clutch control motor 101 is rotated in the reverse direction, the crank 105 is rotated in the clockwise direction from the position B to the position A. The crank portion includes a stopper 113 which projects to the inside of the crank chamber 109. The stopper 113 is arranged at a position where the stopper 113 can stop the further rotation of the bearing 108 in the counterclockwise direction when the bearing 108 gets over a position C at which the bearing 108 retracts the piston 110 to a highest position by pushing and reaches to the position B by being rotated by a distance L2. In the reverse rotation of the bearing 108 from the position B to the position A, the bearing 108 starts the rotation from the position B, gets over the position C at which the bearing 108 retracts the piston 110 to the highest position by pushing, and is brought into contact with the stopper 113 at the position A and is stopped.

The oil pressure generating device 72 includes a hydraulic passage 218 which ranges from an oil supply port 214 to an outlet joint 217 by way of an inlet joint 215 and a chamber 216 for retracting the piston 110 by pushing, and working oil reaches a hydraulic passage 219 of the hydraulic control device 73 by way of the hydraulic passage 218.

Further, a hydraulic passage which reaches the hydraulic hose 74 and the above-mentioned clutch slave cylinder 68 from the hydraulic passage 218 of the oil pressure generating device 72 by way of the hydraulic passage 219 of the hydraulic control device 73 forms a closed hydraulic passage so that a fixed oil pressure in the hydraulic passage is generated by an operation of the above-mentioned piston 110 of the oil pressure generating device 72.

To the hydraulic passage 219 of the oil pressure control device 73, an inlet joint 221, an oil pressure sensor 222, an excess oil absorbing piston 223 and an outlet joint 224 are connected in series. A clutch-working-oil return piston 225 is connected between the excess oil absorbing piston 223 and the outlet joint 224, and a clutch-working-oil valve mechanism 226 is incorporated into the clutch-working-oil return piston 225. As described above, the hydraulic hose 74 is connected to the outlet joint 224, and the hydraulic hose 74 extends toward a rear side of the vehicle body along the main frames 114 as shown in FIG. 1 and FIG. 2 and is connected to the clutch slave cylinder 68 which is mounted on the left end of the main shaft 41 in the drawing as shown in FIG. 3.

The excess oil absorbing piston 223 defines an upper limit of clutch torque capacity. More specifically, as illustrated in FIG. 6, the bearing 108 of the oil pressure generating device 72 passes the position C which is the top dead center at which the bearing 108 retracts the piston 110 to the highest position by pushing when the bearing 108 is rotated in the normal direction from the position A to the position B. Accordingly, in the above-mentioned hydraulic passage, at the moment that the bearing 108 passes the position C which is the top dead center, the elevation of oil pressure attributed to the maximum pushing retraction quantity of the piston 110 is generated. The excess oil absorbing piston 223 is pushed downward due to this oil pressure so that the excess oil is stored in a space formed by the push-down of the excess oil absorbing piston 223. Due to such a constitution, the upper limit of the oil pressure in the hydraulic passage can be defined. Accordingly, it is possible to suppress the abnormal elevation of the pressure caused by the excess oil.

A clutch working oil return piston 225, when it is necessary to bring the multi-disc clutch 80 into a disengaged state such as a case where trouble occurs in the clutch control motor 101, for example, feeds clutch-engaging-use oil in the above-mentioned hydraulic passage into the return piston 225 so that the oil pressure in the hydraulic passage is lowered thus establishing a clutch disengaged state. A clutch working oil valve mechanism 226 is incorporated into the clutch working oil return piston 225, and the clutch working oil valve mechanism 226 houses a check valve 126A therein. The check valve 126A is opened when electricity is not supplied to a solenoid 126B and is closed when electricity is supplied to the solenoid 126B. Accordingly, when trouble occurs, the supply of electricity to the solenoid 126B is stopped so that the check valve 126A is opened thus lowering the clutch-engaging-use oil pressure.

The following is a description of the operation of the clutch actuator 71.

When the clutch actuator 71 functions, the above-mentioned multi-disc clutch 80 (see FIG. 4) is engaged or disengaged. More specifically, at the time of bringing the multi-disc clutch 80 into an engaged state, the clutch control motor 101 is rotated in the normal direction. Due to this rotation, the drive gear 104 and the crank 105 are integrally rotated in the counterclockwise direction from the position A to position B in FIG. 6 by way of the speed-reduction gear train 103 so that the bearing 108 retracts the piston 110 by pushing whereby a hydraulic force in the passage is elevated to a fixed pressure.

Due to such elevation of the hydraulic force, working oil of a fixed pressure is supplied to the clutch slave cylinder 68 by way of the hydraulic passage 219 of the hydraulic control device 73 and the hydraulic hose 74 and moves the clutch lifter rod 66 by pushing rightward (FIG. 4) so that the multi-disc clutch 80 is brought into an engaged state.

In elevating the hydraulic force to the fixed pressure, the bearing 108 starts from the position A, gets over the top dead center position C and comes into contact with the stopper and is stopped at the position B. Accordingly, unless the bearing 108 is rotated in the reverse direction by the clutch control motor 101, the bearing 108 is held at the position B. Accordingly, even when an operation current of the clutch control motor 101 is set to zero, there is no possibility that the crank is pushed back so that there is no possibility that the bearing 108 is rotated in the reverse direction.

At the time of bringing the multi-disc clutch 80 into a disengaged state, the clutch control motor 101 is rotated in the reverse direction. Due to this reverse rotation, the drive gear 104 and the crank 105 are integrally rotated in the clockwise direction from the position B to the position A in FIG. 6 by way of the speed-reduction gear train 103 so that the hydraulic force in the passage is lowered.

Due to such lowering of the hydraulic force, the fixed hydraulic force cannot be created in the clutch slave cylinder 68 so that the clutch lifter rod 66 is moved leftward due to a spring force of the return spring 93 by way of the pressure plate 85, the holder 88 and the lifter 91 as shown in FIG. 4. Due to such movement of the clutch lifter rod 66, the pressure plate 85 is separated from the drive friction plate 81B on the left end in the drawing thus bringing the multi-disc clutch 80 into a disengaged state.

When the motorcycle is stopped, as shown in FIG. 6, the bearing 108 is surely returned to the position A irrespective of the current position thereof so that the multi-disc clutch 80 is brought into a disengaged state. More specifically, as shown in FIG. 5, a position sensor 231 which detects the current positions of the drive gear 104 and the crank 105 are mounted on a shaft end of the rotary shaft 106, and the position sensor 231 is connected to an ECU (not shown in the drawing) of the vehicle. An engine rotational speed sensor (not shown in the drawing) is connected to the ECU. For example, when the engine rotational speed sensor detects that the engine rotational speed becomes equal to or below a predetermined engine rotational speed Ne and the position sensor 231 detects that the bearing 108 is at a position other than the position A, by reference to FIG. 5, the clutch control motor 101 is rotated in the reverse direction so that the bearing 108 is rotated in the clockwise direction from the position B to the position A in FIG. 6 whereby the multi-disc clutch 80 is brought into a disengaged state. In this manner, the multi-disc clutch 80 is brought into a disengaged state by the ECU control at the time of stopping the motorcycle. Thus, even when a power source is turned off, the disengaged state of the multi-disc clutch 80 is maintained.

Accordingly, in this normally-open type clutch structure, different from the prior art, it is unnecessary to provide the clutch release mechanism such as the clutch lever. Thus, even when the power source is turned off at the time of stopping the motorcycle, the rider can move the motorcycle by pushing. In this clutch structure, even when the power source is turned on, working oil is not supplied when the motorcycle is stopped. Thus, the multi-disc clutch 80 is mechanically brought into a disengaged state so that the rider can walk while pushing the vehicle.

Figure 7:
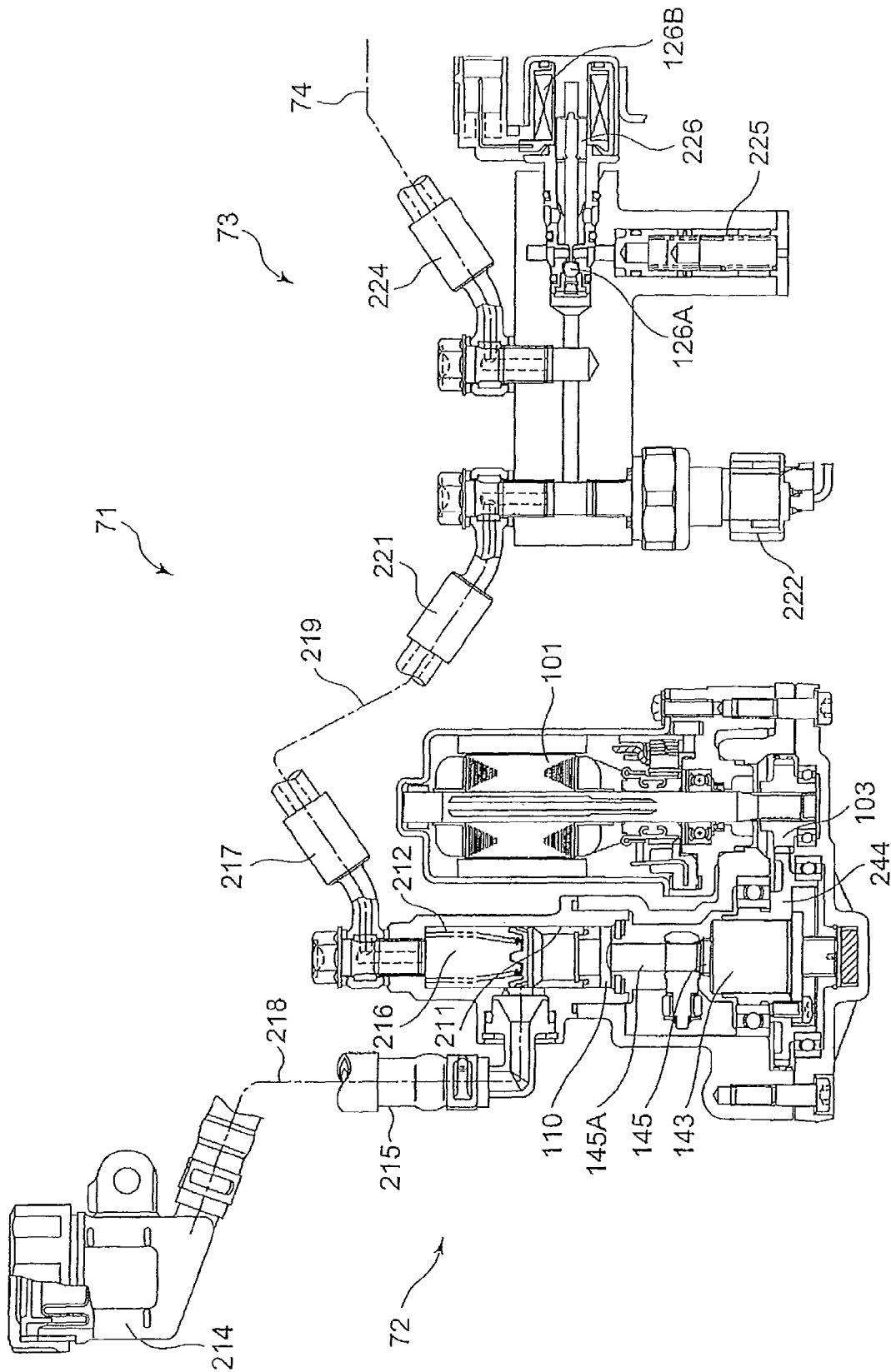
FIG. 7 is a system view of a clutch actuator according to another embodiment.

FIG. 7 shows another embodiment of the present invention. Parts identical with the parts shown in FIG. 5 are given the same symbols and their explanation is omitted. In this embodiment, a gear 244 is connected to an output shaft 102 of a clutch control motor 101 by way of a speed-reduction gear train 103, and a ball screw 143 is fixed to the gear 244. A screw shaft 145 is threadedly engaged with the ball screw 143, and a piston 110 is brought into contact with an upper end 145A of the screw shaft 145. In such a constitution, the mechanism explained in conjunction with FIG. 6 is not present. Thus, the excess oil absorbing piston 223 of the hydraulic control device 73 is unnecessary.

When the clutch control motor 101 is rotated in the normal direction, the gear 244 is rotated in the normal direction by way of the speed-reduction gear train 103 so that the above-mentioned screw shaft 145 which is threadedly engaged with the ball screw 143 is elevated and retracts the piston 110 upward by pushing. Due to such an operation, pressure in a hydraulic system is elevated so that, as mentioned previously, a multi-disc clutch 80 is brought into an engaged state. When the clutch control motor 101 is rotated in the reverse direction, the gear 244 is rotated in the reverse direction by way of the speed-reduction gear train 103 so that the above-mentioned screw shaft 145 which is threadedly engaged with the ball screw 143 is lowered and the piston 110 is pushed downward due to a spring force of a spring 212. Accordingly, the pressure in the hydraulic system is lowered so that the multi-disc clutch 80 is brought into a disengaged state.

It is needless to say that the above-mentioned embodiment is one mode of the present invention and can be suitably varied without departing from the gist of the present invention. In the above-mentioned embodiment, the clutch actuator 71 is arranged on the vehicle-body-left-side wall surface of the front end portion of the main frame 114, and the hydraulic hose 74 extends toward the rear side of the vehicle body along the main frame 114 and is connected to the clutch slave cylinder 68. However, the present invention is not limited to such a constitution, and the clutch actuator 71 may be arranged at any position of the engine E or the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A normally-open clutch structure for a vehicle which includes an engine, a drive wheel driven by the engine, and an automatic transmission arranged between the engine and the drive wheel, and includes a clutch operating mechanism having an actuator, and engages or disengages a clutch provided to the automatic transmission by the actuator,
    wherein the clutch operating mechanism performs a control to bring the clutch into an engaged state when the actuator is operated, and the clutch operating mechanism operates the clutch to bring the clutch into a disengaged state when the actuator is not operated,
    wherein the clutch operating mechanism includes a multi-disc clutch having a clutch outer, a clutch inner and a pressure plate, and
    a cylindrical portion of the pressure plate penetrates a through hole formed in the clutch inner.

2. The normally-open clutch structure according to claim 1, wherein the clutch is a hydraulic clutch, and the clutch operating mechanism is a hydraulic clutch operating mechanism, and
    the hydraulic clutch operating mechanism performs a control to bring the hydraulic clutch into an electrically engaged state when a working oil is supplied from the actuator, and mechanically operates the hydraulic clutch so as to bring the hydraulic clutch into a disengaged state when the working oil is not supplied from the actuator.

3. The normally-open clutch structure according to claim 2, wherein the clutch operating mechanism engages or disengages the clutch without relying on an arbitrary manipulation of a rider.

4. The normally-open clutch structure according to claim 2, wherein the clutch operating mechanism mechanically operates the clutch so as to bring the clutch into a disengaged state by making use of a clutch spring.

5. The normally-open clutch structure according to claim 2, wherein the clutch operating mechanism includes a holder and a lifter are fixedly mounted on a distal end of the cylindrical portion, the lifter is connected to a distal end of a clutch lifter rod, and a clutch spring is arranged between the pressure plate and the clutch inner.

6. The normally-open clutch structure according to claim 2, wherein the vehicle includes a frame bifurcated from a head pipe, the actuator is mounted on the frame, and a hose which extends from the actuator is connected to a clutch slave cylinder mounted on the engine.

7. The normally-open clutch structure according to claim 1, wherein the clutch operating mechanism engages or disengages the clutch without relying on an arbitrary manipulation of a rider.

8. The normally-open clutch structure according to claim 7, wherein the clutch operating mechanism mechanically operates the clutch so as to bring the clutch into a disengaged state by making use of a clutch spring.

9. The normally-open clutch structure according to claim 7, wherein the clutch operating mechanism includes a holder and a lifter are fixedly mounted on a distal end of the cylindrical portion, the lifter is connected to a distal end of a clutch lifter rod, and the clutch spring is arranged between the pressure plate and the clutch inner.

10. The normally-open clutch structure according to claim 1, wherein the clutch operating mechanism mechanically operates the clutch so as to bring the clutch into a disengaged state by making use of a clutch spring.

11. The normally-open clutch structure according to claim 10, wherein the clutch spring is arranged between a pressure plate and the clutch inner.

12. The normally-open clutch structure according to claim 10, wherein the clutch operating mechanism includes a holder and a lifter are fixedly mounted on a distal end of the cylindrical portion, the lifter is connected to a distal end of a clutch lifter rod, and the clutch spring is arranged between the pressure plate and the clutch inner.

13. The normally-open clutch structure according to claim 1, wherein the clutch operating mechanism includes a holder and a lifter are fixedly mounted on a distal end of the cylindrical portion, the lifter is connected to a distal end of a clutch lifter rod, and a clutch spring is arranged between the pressure plate and the clutch inner.

14. The normally-open clutch structure according to claim 13, wherein the clutch spring is arranged on an outer periphery of the cylindrical portion of the pressure plate.

15. The normally-open clutch structure according to claim 1, wherein the vehicle includes a frame bifurcated from a head pipe, the actuator is mounted on the frame, and a hose which extends from the actuator is connected to a clutch slave cylinder mounted on the engine.

16. The normally-open clutch structure according to claim 1, wherein the vehicle has a V-shaped engine, and the actuator is arranged in a space defined between a cylinder and an engine body.

17. The normally-open clutch structure according to claim 16, wherein the actuator, a hose and a clutch slave cylinder are arranged on one side in the vehicle lateral direction.

18. A normally-open clutch structure for a vehicle comprising:
    a clutch operating mechanism having an actuator for engaging or disengaging a clutch adapted to be operatively connected to an automatic transmission;
    said clutch operating mechanism performing a control to bring the clutch into an engaged state when the actuator is operated; and
    said clutch operating mechanism operating the clutch to bring the clutch into a disengaged state when the actuator is not operated,
    wherein the clutch operating mechanism includes a multi-disc clutch having a clutch outer, a clutch inner and a pressure plate, and
    a cylindrical portion of the pressure plate penetrates a through hole formed in the clutch inner.

19. The normally-open clutch structure according to claim 18, wherein the clutch is a hydraulic clutch, and the clutch operating mechanism is a hydraulic clutch operating mechanism, and
    the hydraulic clutch operating mechanism performs a control to bring the hydraulic clutch into an electrically engaged state when a working oil is supplied from the actuator, and mechanically operates the hydraulic clutch so as to bring the hydraulic clutch into a disengaged state when the working oil is not supplied from the actuator.

20. The normally-open clutch structure according to claim 18, wherein the clutch operating mechanism includes a holder and a lifter are fixedly mounted on a distal end of the cylindrical portion, the lifter is connected to a distal end of a clutch lifter rod, and a clutch spring is arranged between the pressure plate and the clutch inner.

* * * * *